US009217653B2

(12) United States Patent
Kleven et al.

(10) Patent No.: US 9,217,653 B2
(45) Date of Patent: Dec. 22, 2015

(54) HIGH PERFORMANCE ARCHITECTURE FOR PROCESS TRANSMITTERS

(75) Inventors: Lowell A. Kleven, Eden Prairie, MN (US); John P. Schulte, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 1325 days.

(21) Appl. No.: 11/854,732

(22) Filed: Sep. 13, 2007

(65) Prior Publication Data
US 2009/0072994 A1 Mar. 19, 2009

(51) Int. Cl.
G08C 19/06 (2006.01)
G01D 21/00 (2006.01)

(52) U.S. Cl.
CPC ...................... *G01D 21/00* (2013.01)

(58) Field of Classification Search
CPC ....................................... G01D 21/00
USPC ......... 340/879.05, 870.07; 324/537; 375/242; 702/60
See application file for complete search history.

(56) References Cited

U.S. PATENT DOCUMENTS

| 4,952,032 | A | * | 8/1990 | Inoue et al. ................ 345/101 |
| 5,216,621 | A | * | 6/1993 | Dickens ........................ 702/58 |
| 5,764,928 | A | * | 6/1998 | Lanctot ................... G06F 13/14 709/237 |
| 6,021,162 | A | * | 2/2000 | Gaboury ............. H04L 27/1563 375/242 |
| 6,236,252 | B1 | * | 5/2001 | Genest .................... G05F 3/262 327/108 |
| 6,640,308 | B1 | * | 10/2003 | Keyghobad et al. .......... 713/300 |
| 6,731,953 | B1 | * | 5/2004 | McGowan et al. ........... 455/561 |
| 7,321,846 | B1 | * | 1/2008 | Huisenga et al. ............ 702/183 |
| 7,698,609 | B2 | * | 4/2010 | Lalla ................... G05B 19/0421 702/127 |
| 8,275,472 | B2 | | 9/2012 | Roth et al. |
| 8,281,174 | B2 | * | 10/2012 | Seiler ................. G05B 19/4185 340/539.3 |

(Continued)

FOREIGN PATENT DOCUMENTS

CN 87106642 6/1998
CN 1313964 A 9/2001
(Continued)

OTHER PUBLICATIONS

"Notification of Transmittal of the International Search Report and the Written Opinion of the International Searching Authority, or the Declaration" for PCT/US2008/010522, filed Sep. 9, 2008, mailed Apr. 6, 2009; 12 pages.

(Continued)

*Primary Examiner* — Amine Benlagsir
(74) *Attorney, Agent, or Firm* — Westman, Champlin & Koehler, P.A.

(57) ABSTRACT

A process transmitter includes at least one sensor which monitors a process variable, and analog-to-digital (A/D) converter circuitry coupled to the at least one sensor and configured to provide process variable data indicative of process variable values. A digital signal processor (DSP) is coupled to the A/D converter circuitry to receive the process variable data. The DSP comprises a co-processor configured to receive and perform calculations on the process variable data from the A/D converter circuitry to generate output data. Communications circuitry of the process transmitter is configured either to control communication over loop wiring which can be coupled to the process transmitter, or to control wireless communications with the process transmitter. A microprocessor, separate from the co-processor of the DSP, is coupled between the co-processor and the communications circuitry to control movement of the output data from the DSP to the communications circuitry.

18 Claims, 10 Drawing Sheets

(56) References Cited

U.S. PATENT DOCUMENTS

| | | | |
|---|---|---|---|
| 8,344,880 B2* | 1/2013 | Seiler | G05B 19/0423 340/539.1 |
| 2003/0202614 A1* | 10/2003 | Braithwaite | H04L 27/367 375/296 |
| 2003/0226002 A1* | 12/2003 | Boutaud | G01R 31/318536 712/234 |
| 2004/0019440 A1* | 1/2004 | Selli | G01D 21/00 702/57 |
| 2004/0184517 A1* | 9/2004 | Westfield | G01D 3/08 375/219 |
| 2005/0289276 A1* | 12/2005 | Karschnia et al. | 710/305 |
| 2006/0049961 A1* | 3/2006 | Deck et al. | 340/870.07 |
| 2006/0290328 A1* | 12/2006 | Orth | G01D 21/00 323/218 |
| 2006/0292292 A1* | 12/2006 | Brightman | H04L 49/10 427/66 |
| 2007/0067119 A1* | 3/2007 | Loewen et al. | 702/57 |
| 2007/0256131 A1* | 11/2007 | Jung et al. | 726/24 |
| 2007/0273508 A1* | 11/2007 | Lalla | G05B 19/0421 340/540 |
| 2008/0036621 A1* | 2/2008 | Koudal et al. | 340/870.11 |
| 2008/0037776 A1* | 2/2008 | Akiyama et al. | 380/44 |
| 2008/0258736 A1* | 10/2008 | Schulz et al. | 324/537 |

FOREIGN PATENT DOCUMENTS

| | | |
|---|---|---|
| CN | 1898616 | 1/2007 |
| DE | 10221772 A1 | 11/2003 |
| DE | 10361465 A1 | 8/2005 |
| WO | WO 97/12347 | 4/1997 |
| WO | WO2008/046694 | 4/2008 |

OTHER PUBLICATIONS

Chinese Office Action from corresponding application Serial No. 200880106779.8, dated Aug. 25, 2011, 10 pgs.

Chinese Office Action from corresponding application Serial No. 200880106779.8, dated Jul. 3, 2012, 7 pgs.

Third Chinese Office Action for Chinese Application No. 200880106779.8, dated Jan. 14, 2013, 10 pages.

Communication dated Oct. 25, 2013 for European Patent Appln. No. 08 830 216.1-2213. 6 pgs.

Rejection Decision for Chinese Patent Application No. 200880106779.8, dated May 6, 2013, 15 pages.

Examination Report from Indian Patent Application No. 362/MUMNP/2010, dated Feb. 13, 2015.

Office Action from Chinese Patent Application No. 2008801106779.8, dated Jul. 31, 2015.

* cited by examiner

HIGH PERFORMANCE ARCHITECTURE FOR PROCESS TRANSMITTERS

BACKGROUND

Process transmitters generally include process variable sensors and measurement circuitry for measuring process related parameters (temperature, pressure, flow rate, volume, etc.). Process transmitters also include output circuitry for transmitting a process parameter output to instrumentation and control equipment. Frequently, this transmission is over an analog circuit, such as a 4-20 mA current loop, which requires analog output circuitry. Also, it is common for process transmitters to transmit process related information using pulse output circuitry to transmit pulses over the current loop or digital communication circuitry to transmit digital signals over the 4-20 mA current loop.

Most "smart" process transmitters share a common architecture which centers around a microcontroller. The demands on the microcontroller are very high as it must generally operate under micro power (typically under 1 mA) requirements; it must read, process and publish sensor updates at a regular rate; it must generally provide signal correction functions to compensate primary sensed variables for various sources of error; it must support digital communication functions; and it must perform and manage diagnostic activities to ensure accurate operation of the process transmitter. Implementation of a system which satisfies the requirements in all of these areas taxes the resources of modern microcontrollers. The resources fall into 3 categories: power consumption, memory space, and execution time.

Microcontroller technology has improved over the years providing much more capability than existed previously. However product requirements and marketing desires have seemingly outpaced advances in microcontroller technology. Future generations of process transmitter products could require more speed, more sophisticated correction algorithms, multi-variable support, and advanced diagnostics, for example. Often, legacy process transmitter architectures only allow incremental improvements to be made to support these needs, potentially falling short of future process transmitter needs.

The discussion above is merely provided for general background information and is not intended to be used as an aid in determining the scope of the claimed subject matter.

SUMMARY

A process transmitter includes at least one sensor which monitors a process variable, and analog-to-digital (A/D) converter circuitry coupled to the at least one sensor and configured to provide process variable data indicative of process variable values. A digital signal processor (DSP) is coupled to the A/D converter circuitry to receive the process variable data. The DSP comprises a co-processor configured to receive and perform calculations on the process variable data from the A/D converter circuitry to generate output data. Communications circuitry of the process transmitter is configured to control communication over loop wiring or to control wireless communications with the process transmitter. A microprocessor, separate from the co-processor of the DSP, is coupled between the co-processor and the communications circuitry to control movement of the output data from the DSP to the communications circuitry for wireless communication or communication over the loop wiring.

BRIEF DESCRIPTION OF THE DRAWINGS

FIG. 2-1 is a block diagram illustrating a first disclosed process transmitter architecture.

FIG. 2-2 is a block diagram illustrating a wireless embodiment of the first disclosed process transmitter architecture.

DETAILED DESCRIPTION

Figure 1:
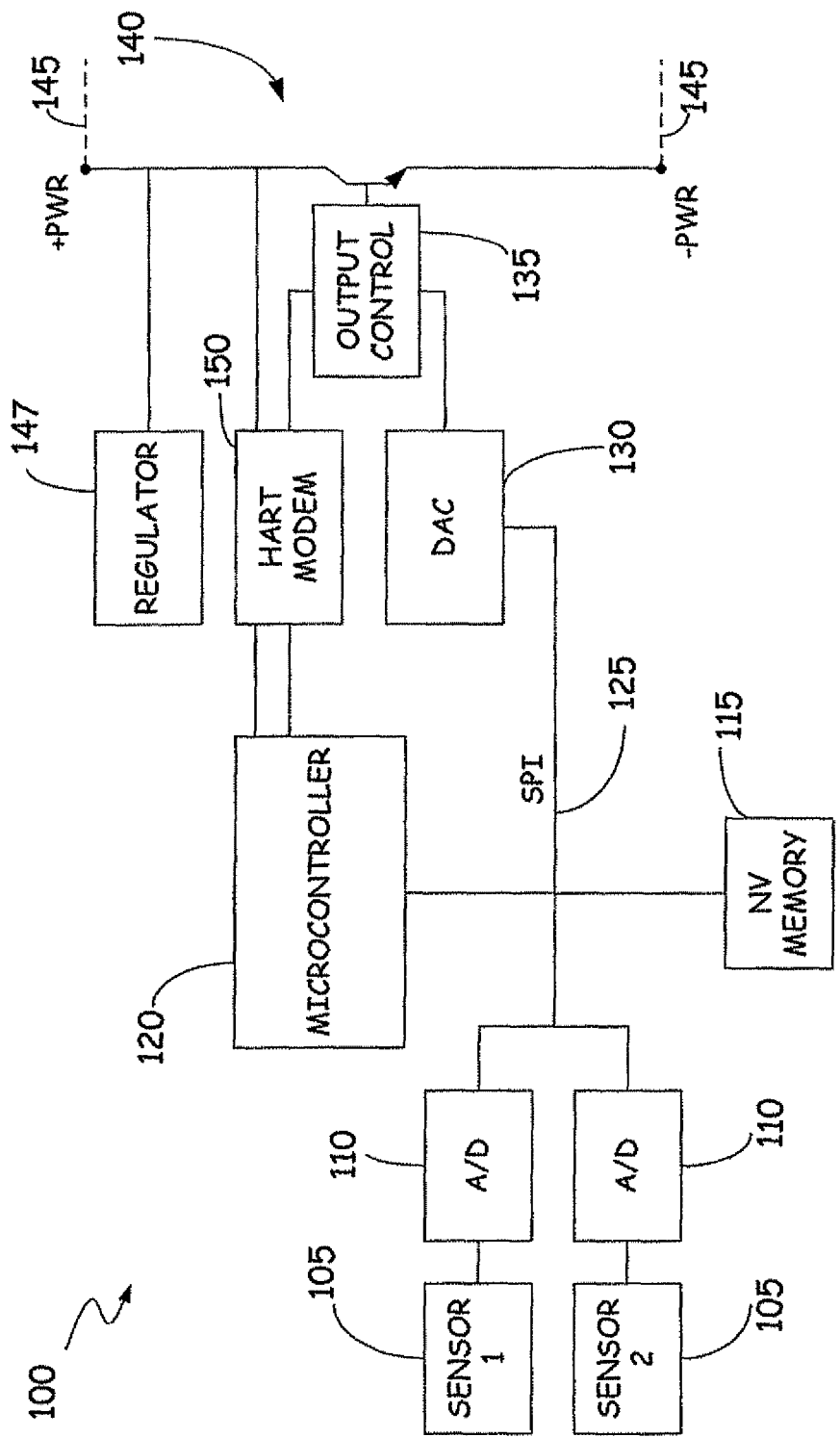
FIG. 1 block diagram illustrating a prior art process transmitter architecture.

Most "smart" process transmitters share a common architecture which centers around a microcontroller as depicted in FIG. 1. As shown in the diagrammatic illustration of the circuitry of process transmitter 100 provided in FIG. 1, the architecture of conventional process transmitters includes one or more process variable sensors 105, and corresponding analog-to-digital (A/D) converters 110 which convert the analog sensor signals into representative digital signals. The process transmitters also typically include non-volatile (NV) memory components 115 for storage of process variable or other information during operation. The microcontroller 120 communicates with A/D converters 110 and memory components 115 over a bus such as a serial peripheral interface (SPI) bus 125. SPI bus 125 and the corresponding SPI protocols which can be used to communicate between master (e.g., microcontroller 120) and slave (e.g., A/D converters 110, memory components 115, etc.) devices are well known in the art. Disclosed embodiments, though demonstrated with reference to SPI bus usage, are not limited to use with SPI buses and the SPI protocol. Communication using other methods can be implemented instead, for example using a multi-master serial computer bus I²C or a universal asynchronous receiver transmitter (UART). In addition to managing and controlling communication with devices such as A/D converters 110 and memory components 115, microcontroller 120 typically performs sensor and sensed process variable related functions such as reading and processing the process variable signals, signal correction, diagnostic functions, etc.

As shown in FIG. 1, conventional process transmitter 100 also typically includes digital-to-analog (DAC) circuitry 130 under the control of microcontroller 120 to in turn provide control signals to output control circuitry 135, which controls the 4-20 mA signal on a process control loop (e.g., via control of the output circuitry 140). The process control loop to which process transmitter is coupled is represented using dashed lines 145. Process transmitter 100 also typically includes regulator circuitry 147 which receives power from loop 145 for powering components of the transmitter. Also typically under the control of microcontroller 120, process transmitter 100 includes a digital communications protocol (e.g., HART®) modem 150 which communicates with the output control circuitry 135 to transmit digital signals across the 4-20 mA loop using the digital communications protocol. Also, instead of transmitting over a 4-20 mA loop, wireless transmission of digital signals can also be used.

As can be seen, the demands on the microcontroller are very high as it must typically adhere to requirements, which are provided as examples and are not represented as being absolute requirements, such as those included in the following list:

- Micro power operation (under 1 mA)
- Real time operating system: it must read, process, and publish sensor updates at a regular rate (e.g., typically every 45 mS)
- Signal correction: it reads sensor information and executes a correction algorithm to compensate the primary variable for various sources of error.
- Digital communication: all smart devices support a digital communication protocol (e.g., the HART® communication protocol). This places a burden on the microcontroller to accept and validate messages, compose a response, and publish.
- Diagnostic activity: the controller must manage diagnostic activity that ensures accurate operation of the device.

As noted above, implementation of a system in a process transmitter which satisfies the requirements in all of these areas taxes the resources (e.g., power consumption, memory space, and execution time) of modern microcontrollers. Given that the process transmitter product requirements often outpace improvements in microcontroller technology, different process transmitter architectures are disclosed which allow performance improvement beyond what microcontroller technology improvements would otherwise allow. These process transmitter architectures can help to provide more speed (e.g., 20 mS update rates), more sophisticated correction algorithms, multi-variable support, and advanced diagnostics, for example, without exceeding power limitations.

The term "DSP" (digital signal processor) refers to a broad range of techniques for operating on digital (binary) signals. The implementation is typically hardware oriented, but it can also be done using software executed by a microcontroller. The advantage of using a hardware approach is that computational operations can be done much more efficiently than a software approach. To this end there are many off the shelf hardware DSP products available. The vast majority of these products however are geared for high speed, high power environments where current consumption can easily exceed 100 mA. Since these devices are designed to run fast (e.g. 100 MHz) they typically do not allow their power/performance to scale to the power levels that loop powered process instruments demand.

In exemplary embodiments, a DSP is used which is a mixture of hardware operating algorithms and software operating in a coprocessor. This takes advantage of lower power for hardware implementations (at the cost of flexibility) and software to provide flexibility and to facilitate easy update processes. Examples of such mixed DSP architectures include flowmeter DSP chips that utilize hardware filters and a coprocessor configured with software. In the present embodiments, hardware can be used to implement polynomial equations that determine pressure from the A/D converter values and temperature values for the various sensors that are used. In these equations, only the coefficients need to be changeable, and that can be handled using registers.

Figures 1, 2:
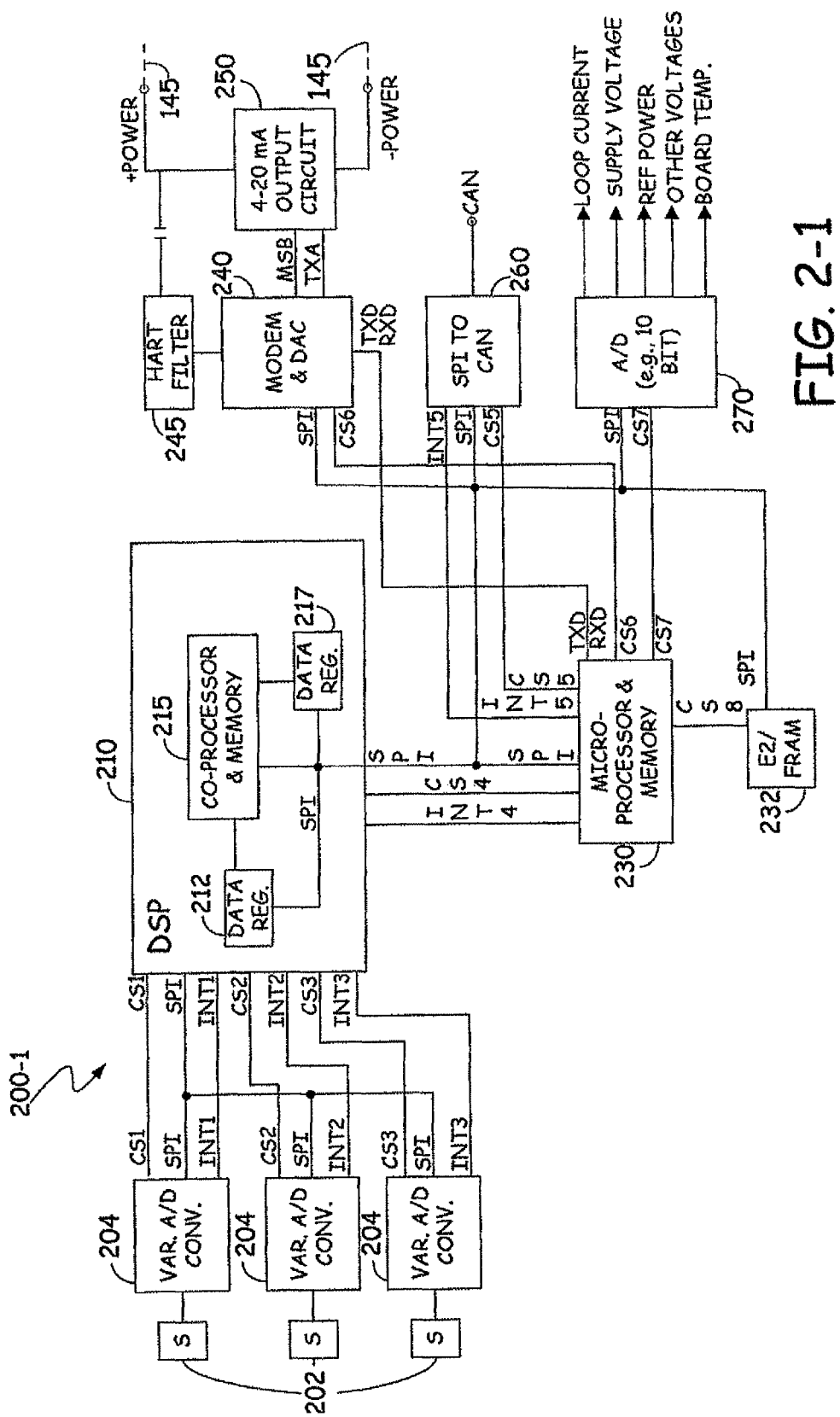
Figure 2:
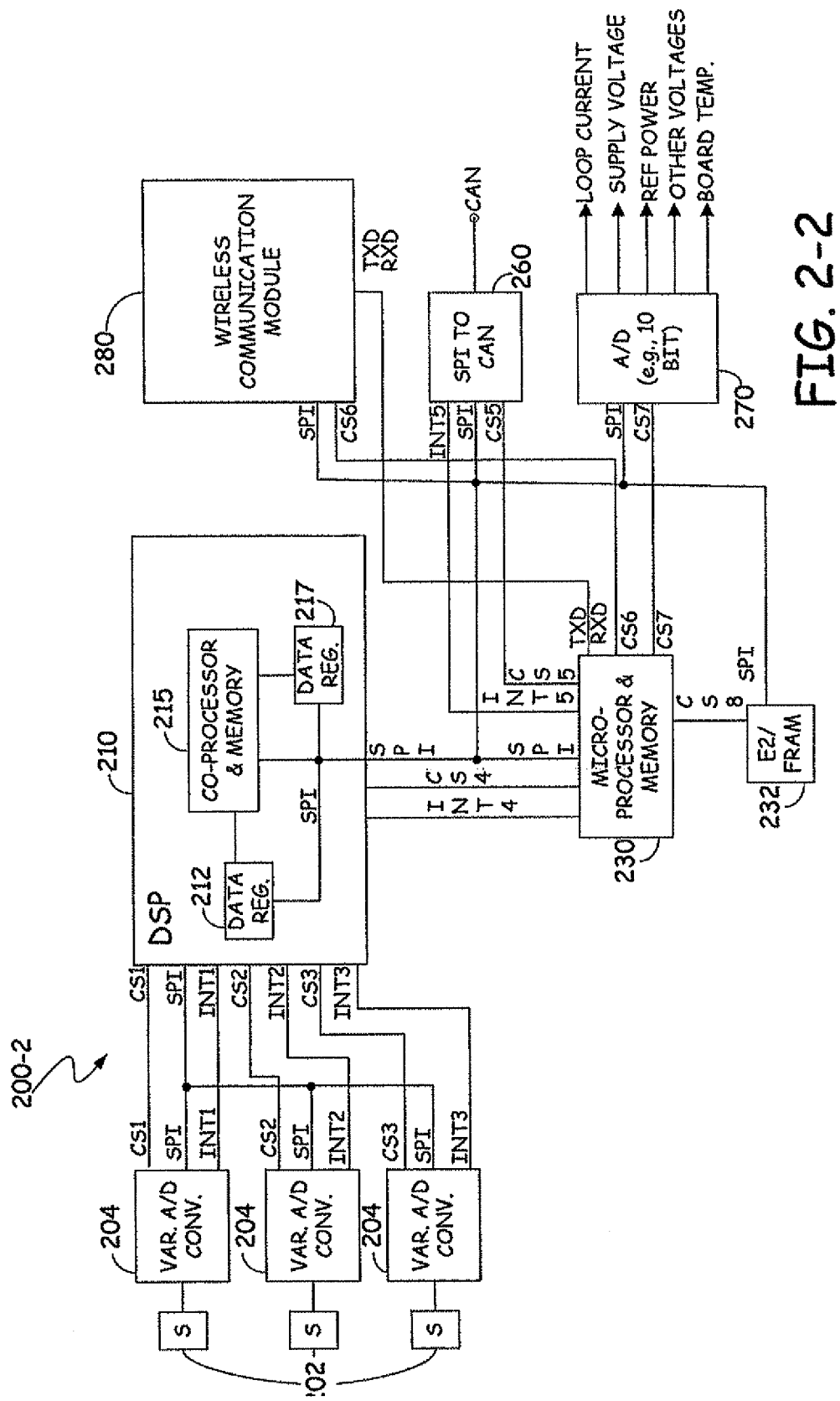

FIG. 2-1 is a block diagram illustrating a process transmitter 200-1 which uses a first architecture to improve transmitter performance. Shown in FIG. 2-1 are three sensors 202 for monitoring a process, though this and other embodiments are not limited to any particular number of sensors. Sensors 202 can be, for example, differential pressure (DP) sensors, pressure (P) sensors, temperature (T) sensors, etc. Each sensor 202 is coupled to an A/D converter 204 which converts the sensor outputs to digital values. Each A/D converter 204 is coupled to a digital signal processor 210 via a chip select (CS) line, an interrupt (INT) line, and a serial peripheral interface (SPI) bus. When the A/D converters 204 have updated sensor information, they generate an interrupt on the INT line, and after being selected by the DSP 210 using the corresponding CS line, the selected A/D converter transmits it updated sensor data to the DSP over the SPI bus. Each of the A/D converter 204 slave devices will have a separate CS line (e.g., CS1, CS2 and CS3) and a separate INT line (e.g., INT1, INT2 and INT3), but can share an SPI bus. Other components will similarly have distinct CS and INT lines, but can share SPI buses. Hereafter, for simplicity, these lines are generically referred to as CS and INT lines, but it must be understood that generally distinct CS and INT lines will typically be used.

Unlike conventional process transmitter architectures in which a microcontroller, such as microprocessor 230, handles both the sensor data processing (e.g., calculation, compensation, etc.) functions and the communication functions for transmitting the sensor related data over a two-wire process loop, in the architecture used in FIG. 2-1, a separate DSP 210 is positioned between the microprocessor 230 and the A/D converters 204. The DSP 210 performs the sensor interface functions (e.g., handling interrupts and receiving sensor data) and the sensor data calculation functions, while microprocessor 230 performs the loop communication functions.

DSP 210 reads the values provided by A/D converters 204 over an SPI bus and stores them in input data registers 212. Co-processor 215 in DSP 210 then calculates the output values, stores them in output data registers 217, and creates an interrupt to the microprocessor 230 which has associated memory such as $E^2$ or FRAM memory, for example. Generally, microprocessor access to the A/D converters will be provided through DSP 210 to avoid timing issues and bus contention issues.

Once the microprocessor 230 receives the sensor information calculated by DSP 210, it controls the transmission of the data over the process loop 145 using a digital communication modem and/or a digital-to-analog converter (DAC). In the illustrated embodiment, the digital communication modem and the DAC are combined into a single communications circuitry chip 240. However, in other embodiments, separate digital communication modem and DAC chips are used. The representation of these circuits in a single chip does not limit disclosed embodiments to this configuration. An example of a digital communications modem is a HART modem which communicates over the two-wire process loop 145 using the HART communications protocol. Loop communications can also be through other industry standard communication protocols. Examples of suitable industry standard communication protocols include, but are not limited to, HART®, FOUNDATION™ Fieldbus, Profibus-PA and Controller Area Network (CAN). Illustration in the present FIGS. of digital communications modems in the form of HART® modems is an example only, and does not limit disclosed embodiments to the HART® communication protocol.

A HART® filter 245 is coupled to the 4-20 mA lines of the process loop and filters out the DC component so that a frequency shift keying (FSK) signal used in HART® communications can be analyzed. The DAC is used to control the output circuit 250, which in turn sets the 4-20 mA current on loop 145. The digital communications modem is used to transmit a digital signal over the current loop via the output circuit 250. Communication with the digital communications modem or DAC is implemented, for example, using CS and SPI bus lines. Also, for the digital communications modem portion of communications circuitry 240, a transmit data (TXD)/receive data (RXD) line between the microprocessor 230 and the communications circuitry 240 is also used to control the transmission or receipt of digital data. A transmit data line and signal (TXA) is provided between circuitry 240 and output circuit 250 to control the output circuit to thereby facilitate the digital communications over the loop. A one-bit signal MSB (e.g., most significant bit signal), which is a pulse density modulated signal, can be provided from the DAC portion of the communications circuitry to the output circuit 250 to control the loop current levels.

In addition to handling communication functions over the process loop, microprocessor 230 also controls other communications functions, such as controller area network (CAN) communications. A SPI-to-CAN communications chip communicates between microprocessor 230 and CAN devices, using INT, CS and SPI bus lines in the illustrated embodiment. Also, microprocessor 230 communicates with a diagnostics A/D converter 270 which is used for purposes of diagnostics and monitoring safe operation of the system. In an example embodiment, A/D 270 is a 10-bit device used in conjunction with monitoring loop current levels, supply voltage levels, reference power and other voltages, and board temperature.

In the architecture utilized in process transmitter 200-1, microprocessor 230 is unburdened by the conventional tasks of handing measurement channel A/D interrupts and the resulting computations on sensor data. Instead, microprocessor 230 is reserved primarily for communications or system control. This is particularly useful since, with the low power levels which are available for process transmitters powered from the process loop 145, the main microprocessor has had difficulty in keeping up with faster sample rates (resulting in faster interrupt rates, etc).

FIG. 2-1 illustrated a process transmitter configured to communicate over a process control loop. Other embodiments, however, can be configured to communicate wirelessly with a control room, with other process devices, or with other devices in general. An example of such a wirelessly communicating process transmitter 200-2 is provided in FIG. 2-2. Process transmitter 200-2 has an architecture which is the same as the architecture of process transmitter 200-1 shown in FIG. 1, with the exception of components which aid in the transmission of data over a process control loop. For example, since process transmitter 200-2 does not communicate over a process control loop (or at least does not do so exclusively), output circuitry 250 need not be included in all embodiments. Similarly, communications circuitry chip 240 and HART filter 245 may be omitted, or may have any of their necessary functionality implemented elsewhere, for example in wireless communication module 280, which can replace the components from process transmitter 200-1 which were related to loop communications. If both wireless communication and communication over a process control loop was desired, communication module 280 could be included with components 240, 245 and 250, and could be separately connected to microprocessor 230, for example.

Depending on the application, wireless communication module 280 may be adapted to communicate in accordance with any suitable wireless communication protocol including, but not limited to: wireless networking technologies (such as IEEE 802.11(b) wireless access points and wireless networking devices built by Linksys of Irvine, Calif.) cellular or digital networking technologies (such as Microburst® by Aeris Communications Inc. of San Jose, Calif.), ultra wideband, global system for mobile communications (GSM), general packet radio services (GPRS), code division multiple access (CDMA), spread spectrum technology, short messaging service/text messaging (SMS), or any other suitable radio frequency wireless technology. Further, known data collision technology can be employed such that multiple process transmitters and/or handheld field maintenance tools employing radio frequency communication module 280 can coexist and operate within wireless operating range of one another. Such collision prevention can include a number of different radio-frequency channels and/or spread spectrum techniques. Additionally, communication module 280 can be a commercially available Bluetooth communication module. In the embodiment illustrated in FIG. 2-1, communication module 280 is a component within transmitter 200-2 that is coupled to an antenna (not shown) that may be an internal or external antenna. In other embodiments, module 280 can be external to transmitter 200-2.

Remaining process transmitter embodiments are illustrated, for example purposes, as being of types which couple to and communicate via a process control loop (e.g., wired embodiments). However, it must be understood that each of these embodiments should be interpreted as also encompassing a corresponding wirelessly communicating process transmitter embodiment. In these corresponding wireless embodiments, circuitry (shown in the corresponding wired embodiment) relating to communication over the process control loop can be replaced with wireless communication module 280. Further, due to the common architectures employed, for discussion purposes, process transmitters 200-1 and 200-2 are hereafter generically referred to as process transmitter "200", and FIGS. 2-1 and 2-2 are generically referred to as "FIG. 2".

Figure 3:
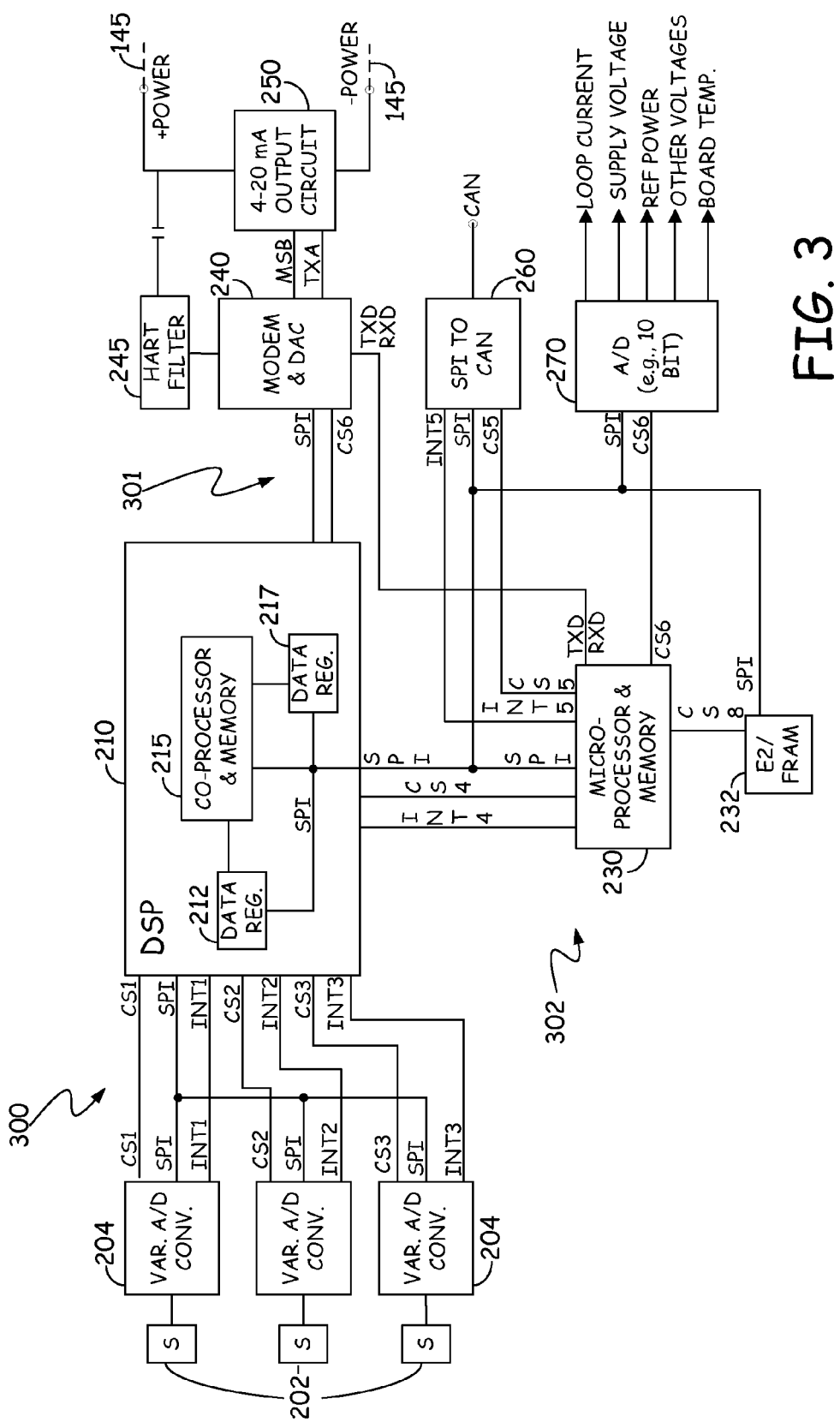
FIG. 3 is a block diagram illustrating a second disclosed process transmitter architecture.

FIG. 3 is a block diagram illustrating a process transmitter 300 which uses a second architecture very similar to the architecture used in process transmitter 200 shown in FIG. 2. In this architecture, microprocessor 230 is removed from the data path 301 used to control the 4-20 mA current on process loop 145. To accomplish this, the output DAC portion of communications circuitry 240 is driven directly from the DSP 210. As can be seen in FIG. 3, a CS and an SPI bus are coupled between DSP 210 and communication circuitry 240 to facilitate this data path. This results in less latency from the time an A/D converter 204 issues pressure data to the time that the analog output is updated; as there is less communication required within the transmitter. As represented by data path 302, the digital communication to the digital communications modem portion of circuitry 240 still goes through the microcontroller 230 to the modem (see e.g., TXD/RXD lines), as does digital communication to the CAN interface 260.

Figure 4:
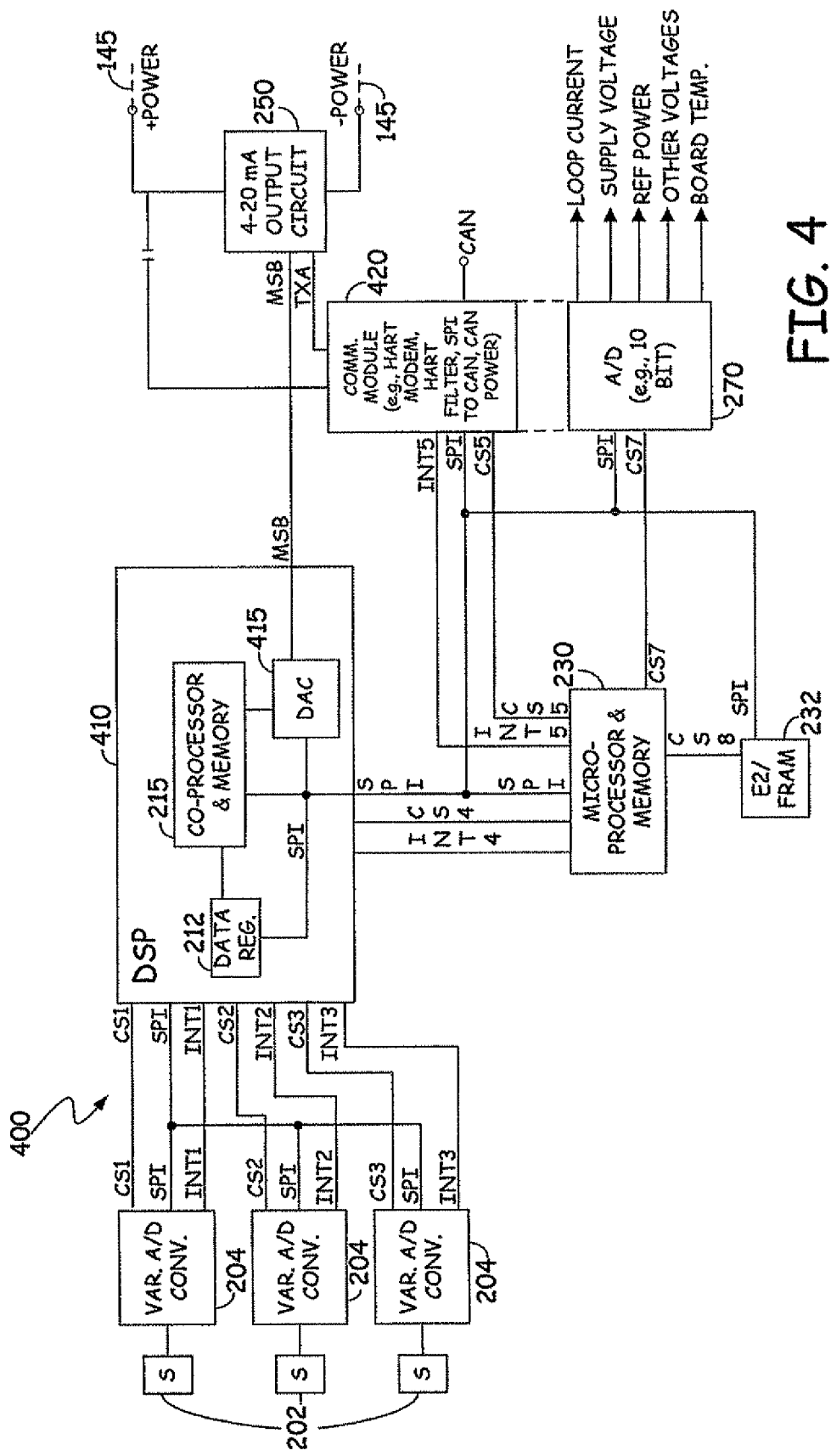
FIG. 4 is a block diagram illustrating a third disclosed process transmitter architecture.

FIG. 4 is a block diagram illustrating a process transmitter 400 which uses a third architecture having similarities to the architectures used in process transmitters 200 and 300 shown in FIGS. 2 and 3. Process transmitter 400 differs from process transmitter 300, for example, in several ways. First process transmitter 400 includes an additional application specific integrated circuit (ASIC) in the form of communication module 420. Communication module 420 is a single ASIC that performs the functions of the digital communication (e.g., HART) modem from communication circuitry 240, of the filter 245, of the SPI-to-CAN interface 260, and of CAN power circuitry. Also, as represented using dashed lines, the system diagnostic A/D converter 270 can also be implemented as part of communications module 420 in some embodiments.

To allow these functions from various circuit components to be combined into a single communications module 420, the DAC functions from communication circuitry 240 is separated from the digital modem functions, allowing the digital modem functions to be implemented in the communications module. The DAC circuitry can then instead be implemented elsewhere as a stand alone integrated chip (IC) if desired. In an exemplary embodiment as illustrated in FIG. 4, the DAC circuitry 415 is added to the DSP 410, and the DSP 410 then communicates directly with 4-20 mA output circuit 250 to control the 4-20 mA current on loop wiring 145. In addition to differing from DSP 210 by its inclusion of DAC 415, DSP 410 can optionally omit the output registers 217, as the DAC controlling values are provided directly to output circuit 250 instead of being handled via interrupts by microprocessor 230.

Figure 5:
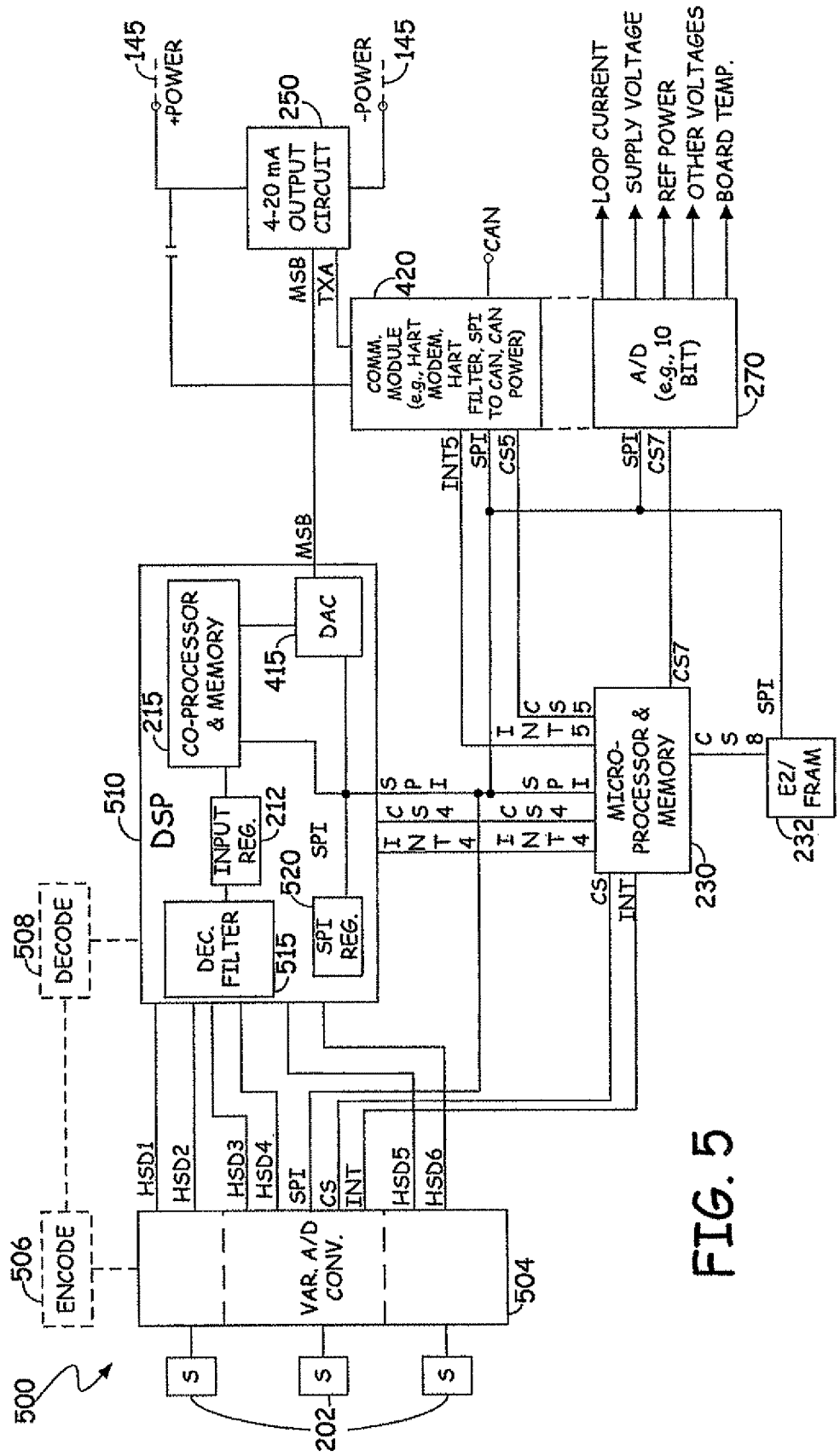
FIG. 5 is a block diagram illustrating a fourth disclosed process transmitter architecture.

FIG. 5 is a block diagram illustrating a process transmitter 500 which uses a fourth architecture. In process transmitter 500, the A/D converters which are coupled to the sensors 202, include only analog circuitry portions, and not the digital circuitry decimation filters which often are implemented within an A/D converter (e.g., within A/D converters 204). As illustrated, the multiple A/D converters are merged into a single chip 504. However, as represented by dashed lines, A/D converters 504 can be implemented as separate chips instead. Each of the A/D converters provides its sensor related signal over a pair of high speed data (HSD) 1-bit data lines, which are coupled to DSP 510.

DSP 510, which implements similar functions as described above with reference to DSP 410 shown in FIG. 4, implements the decimation filters 515 for the A/D functions. The decimation filter(s) 515 create multi-bit words (e.g., 24-bit words) representing the sensor values. To do so, the decimation filter converts the high speed 1-bit signals provided on the HSD lines to the multi-bit words by down-sampling into long words at a lower frequency. The multi-bit words produced by the down-sampling of the decimation filters can then be stored in the input registers 212 as in previous embodiments. An SPI communications register 520 can be included, acting as an input and/or output register, for storing data to be communicated on one or more SPI buses. As illustrated, this embodiment also doesn't necessarily need an output register for the DAC, as the DAC 415 can get the necessary data directly from the co-processor 215 of the DSP 510. However, a DAC output register can be included for this or other purposes such as allowing the microprocessor 230 to read the values for testing, diagnostics, etc. This is shown for example in an embodiment illustrated in FIG. 8 and described further below.

In some optional embodiments, as illustrated, microprocessor 230 and A/D converters 504 can communicate directly between each other for diagnostics configuration, or other purposes. This is facilitated in process transmitter 500 via the addition of INT, CS and SPI bus lines connecting A/D converters 504 and microprocessor 230. Also, instead of (or in addition to) communication between A/D converters 504 and DSP 510 using the HSD lines, an encoder 506 and a decoder 508 can optionally be added to the process transmitter to facilitate secure communications between the A/D converters 504 and remaining portions of the process transmitter.

In process transmitter 500, analog components can be completely separated from digital components, using a three or more ASIC configuration. With the decimation filter function added to DSP 510 along with other digital functions, smaller geometries can be used for the digital components, and less power consumption can result. This can be an important factor as process transmitter manufacturers attempt to add more and more functionality to their devices, while still being constrained by the same power limits.

Figure 6:
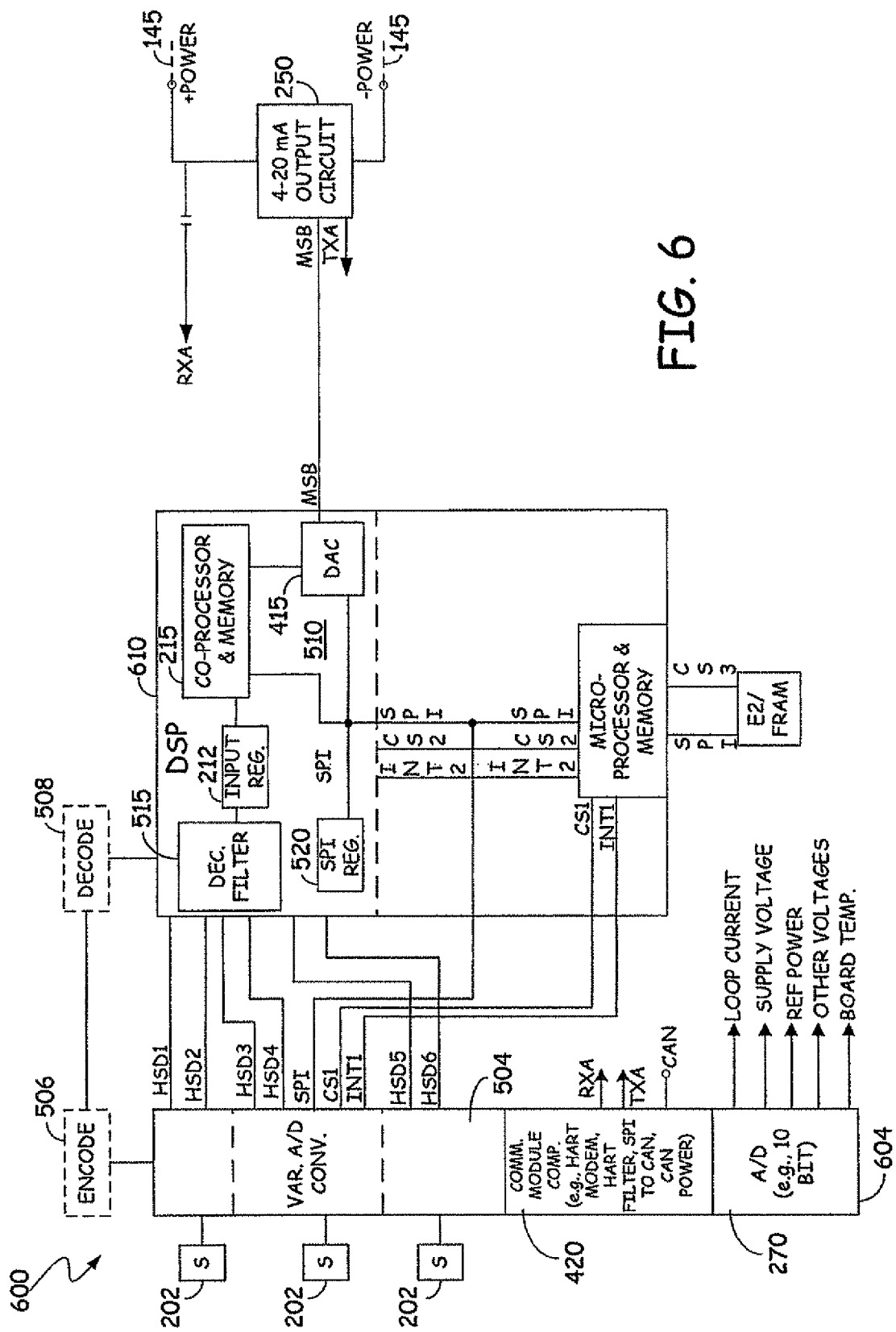
FIG. 6 is a block diagram illustrating a fifth disclosed process transmitter architecture.

FIG. 6 is a block diagram illustrating a process transmitter 600 which uses a fifth architecture similar to the architecture of process transmitter 500, but with further IC integration. As can be seen in FIG. 6, the output ASIC or communications module 420 (which can include A/D converter 270) is merged with the A/D ASIC 504 to form mixed mode ASIC 604 since both are mixed mode devices. Also, the DSP ASIC 510 is merged with the system microcontroller 230 into a single digital DSP ASIC 610 since these are both purely digital devices. This architecture potentially makes the best use of available technology. The optimal "digital" process can be used for the DSP ASIC 610, and the optimal "mixed mode" process can be used for the A/D ASIC 604.

Figure 7:
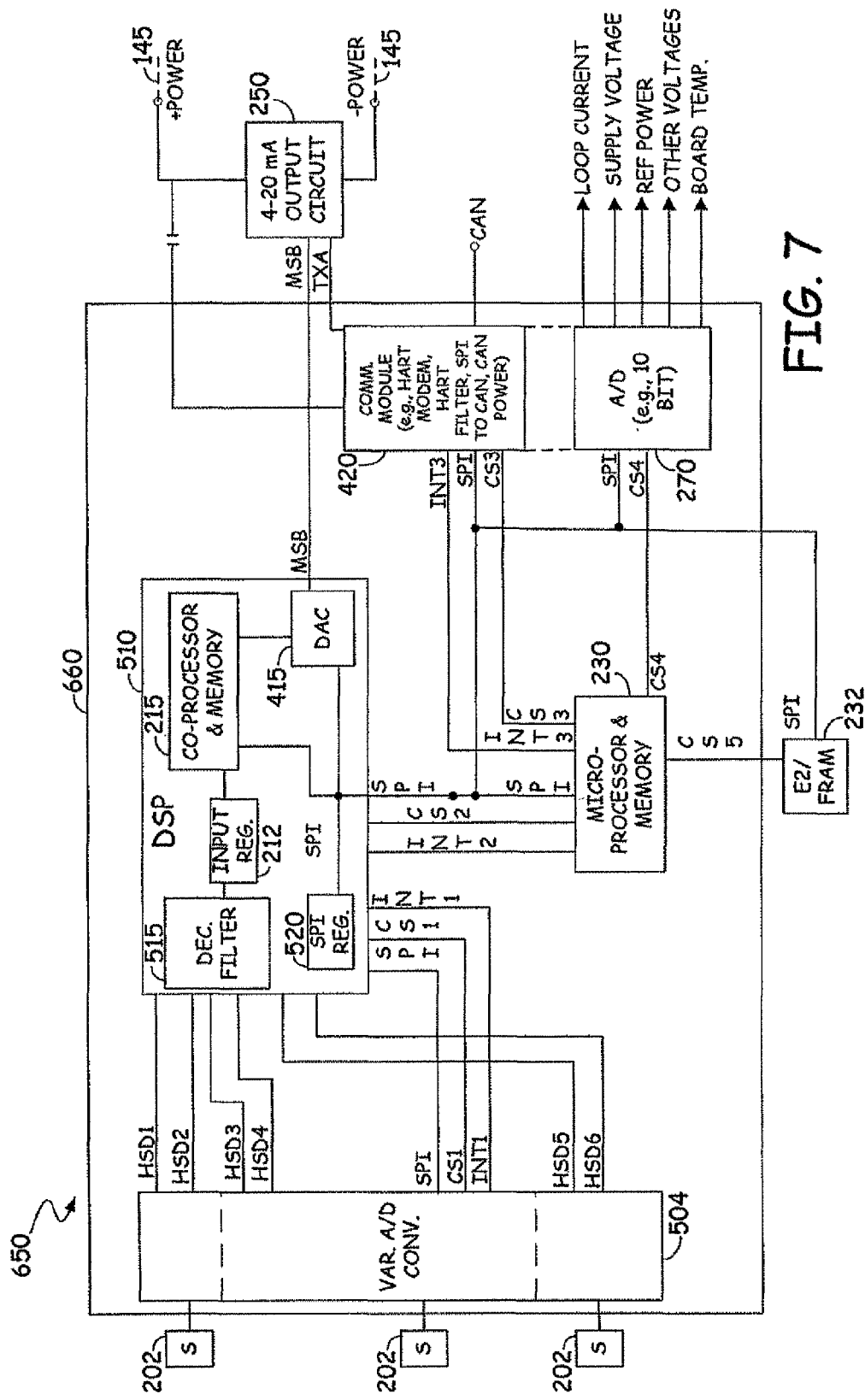
FIG. 7 is a block diagram illustrating a sixth disclosed process transmitter architecture.

FIG. 7 is a block diagram illustrating a process transmitter 650 which uses a sixth architecture similar to the above-described architectures, but with further IC integration. In process transmitter 650, a single ASIC 660 is used to implement the A/D converters, the DSP, the microprocessor, and the communications module. In an example embodiment, the only components not implemented within single ASIC 660 are the sensors 202, the output circuit 250, and optionally an external memory device 232. The architecture shown in FIG. 7 potentially sacrifices some power efficiency due to the combination of analog and digital components, but also potentially provides costs savings in integrated chip production.

Figure 8:
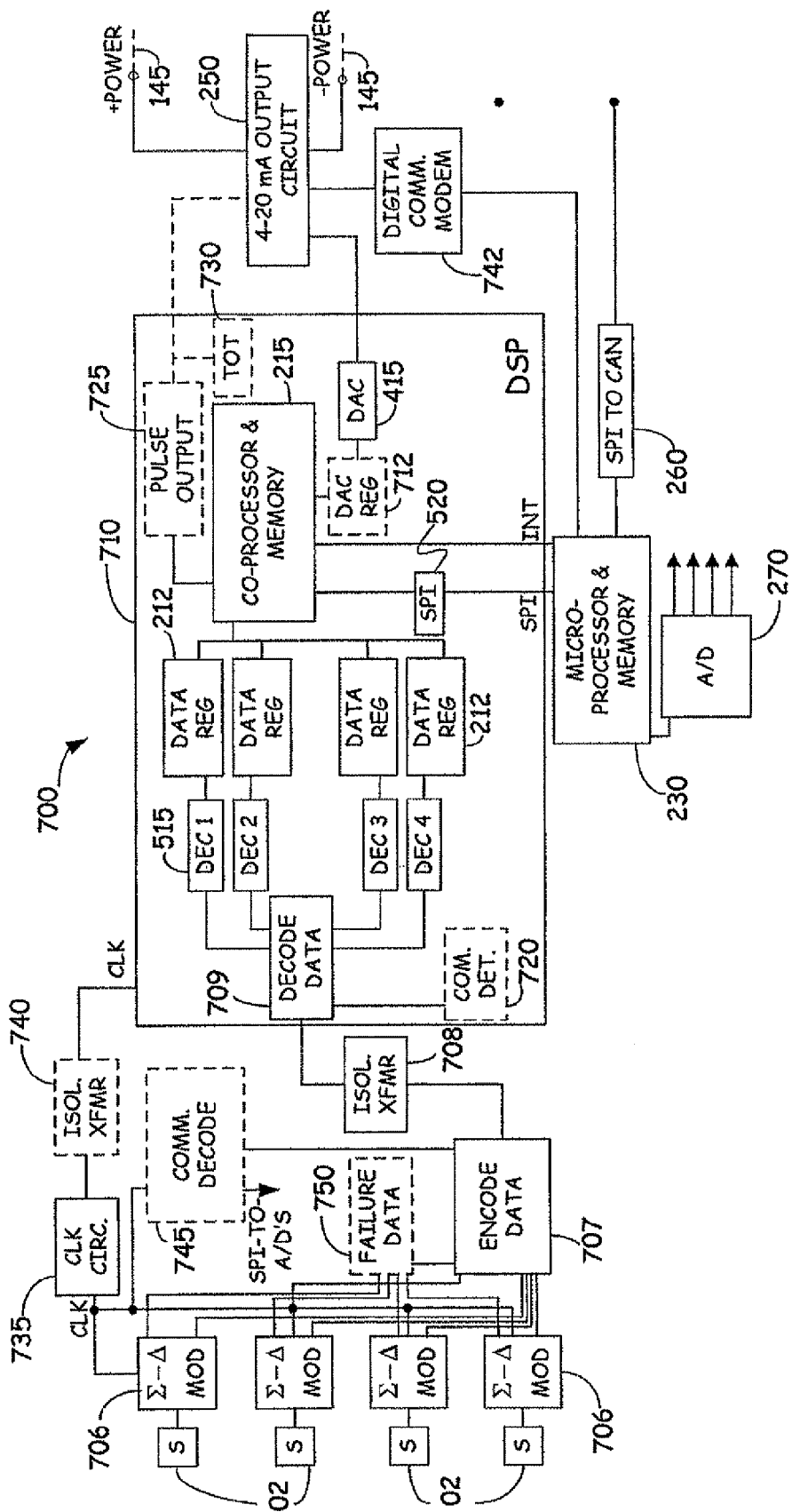
FIG. 8 is a block diagram illustrating a seventh disclosed process transmitter architecture.

FIG. 8 is a block diagram illustrating a process transmitter 700 which uses an isolated measurement channel. In the illustrated embodiment of this architecture, the sensor A/D converters are in the form of sigma-delta modulators 706 which provide high speed data signals such as those illustrated in FIGS. 5-7. Although illustrated as sigma-delta modulators 706, the sensor A/D converters need not be sigma-delta modulators in all embodiments. Further, the A/D converter circuitry illustrated in previous FIGS. can be in the form of sigma-delta modulators.

The HSD lines from sigma-delta modulators 706 are fed into a data encoder 707, which combines the data streams from the sigma-delta modulators into a single data stream. The single data stream is passed through an isolation transformer 708, and provided to a data decoder 709 included within DSP ASIC 710. The decoder 709 separates the single data stream back into separate data streams. Decimation filters 515 inside the DSP 710 then transform each individual data stream into multi-bit words. Each multi-bit word is then stored in a data register 212. Although in some FIGS. decimation filter 515 and data register 212 are illustrated by single boxes, these circuitry components can be implemented using multiple decimation filters and multiple data registers, as shown in FIG. 8.

Aside from the inclusion of data decoder 709, DSP 710 functions very similarly to the architectures described above. Co-processor 215 is again coupled to data registers 212 and is configured to perform calculations on the data in registers 212. A DAC register 712 is optionally included for storing data from co-processor 215 before it is provided as an input to DAC 415 for controlling output circuit 250 to set the 4-20 mA current on the loop wiring 145. Also as in above-described architectures, an SPI data register 520 is coupled to co-processor 215 and other components to facilitate SPI communications with microprocessor 230. Microprocessor 230 again controls digital communications via digital communication modem 742.

Also shown in DSP 710 is optional communication detection circuitry 720 which detects whether communication with the sensors/sigma-delta modulators has been interrupted so that the microprocessor 230 in charge of communication over the loop wiring can be notified accordingly. Also optionally included in DSP 710 in flowmeter embodiments of process transmitter 700 is pulse output circuitry 725 coupled between co-processor 215 and output circuit 250. Pulse output circuitry 725 controls output circuit 250 to generate a pulse output, the frequency of which is indicative of flow. A totalizer circuit 730 coupled to the pulse output is configured to keep a total flow count based on the pulse output.

Also included in process transmitter 700 is clock circuit 735 which provides a clock signal for operation of components. Optionally, a second isolation transformer 740 can be used to provide the clock signal also to DSP 710 while maintaining the isolation of the DSP from the measurement channel circuitry. Two other optional components in process transmitter 700 include communication decoding circuitry 745 and failure data storage circuitry 750. The communication decoding circuitry 745 is coupled to data encoder 707 and used to decode the encoded data for various purposes such as diagnostic functions, etc. The failure data storage circuitry 750 stores data indicative of failures in sensor or other component functionality.

Figure 9:
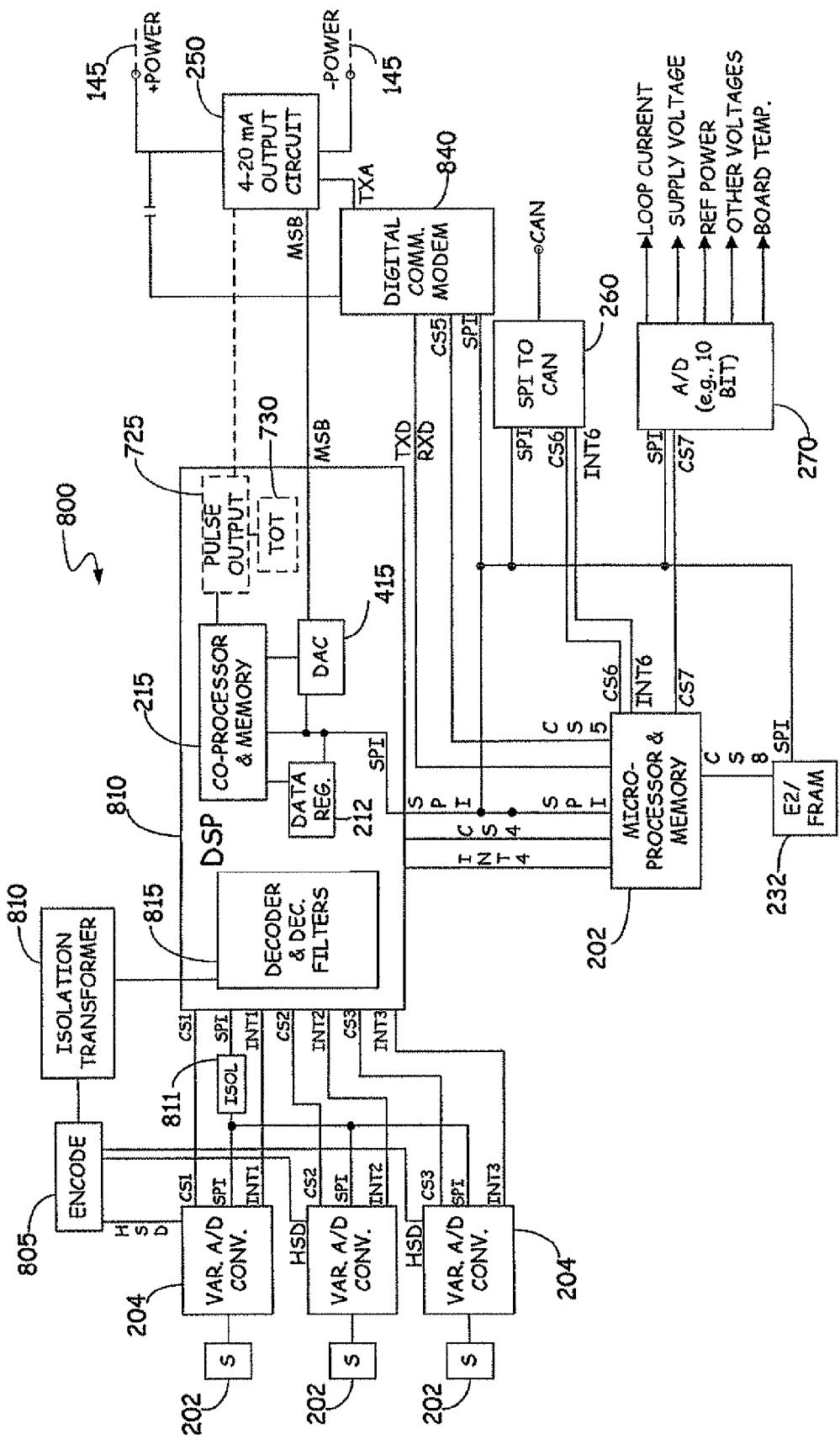
FIG. 9 is a block diagram illustrating an eighth disclosed process transmitter architecture.

FIG. 9 is a block diagram illustrating a process transmitter 800 which uses an architecture representing an upgrade from earlier described architectures, for example from process transmitters 200, 300 or 400 which did not originally utilize HSD lines or isolation features. In this embodiment, communication between the variable A/D converters can be by either or both of and SPI bus using INT and CS methodology, or HSD lines. To facilitate communication via HSD lines which are provided from A/D converters 204, an encoder 805 is provided which functions similar to encoder 707 shown in FIG. 8. An isolation transformer 510 is also included to provide isolation between the DSP and the measurement channel of the process transmitter 800. The encoded data is transmitted across the transformer 810. To decode the data, decoding and decimation filter circuitry 815 is included within DSP 810. Since isolation is provided between the HSD lines and DSP 810, isolation circuitry 811 (which can include encoding circuitry, an isolation transformer and decoding circuitry, for example) can be included between the SPI bus and DSP 810 as well. Other features of process transmitter 800 are the same or similar to identically numbered features of architectures described with reference to other FIGS. For illustrative purposes of the variety of different architectures with which this HSD and isolation upgrade can be used, in FIG. 9 the digital modem portion of communications circuitry 240 from FIGS. 3 and 4 is illustrated as a separate component 840 instead of being combined with either the DAC 415 or with other components in a communications module 420.

Although the present invention has been described with reference to example embodiments, workers skilled in the art will recognize that changes may be made in form and detail without departing from the spirit and scope of the invention. For example, various features of different embodiments can be combined for particular implementations. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A process transmitter for monitoring pressure of a process, comprising:

at least one pressure sensor which monitors a process pressure;

analog-to-digital (A/D) converter circuitry coupled to the at least one pressure sensor and configured to provide process pressure data indicative of process pressure values;

a digital signal processor (DSP) coupled to the A/D converter circuitry to receive the process pressure data, the DSP comprising a co-processor configured to receive and perform calculations on the process pressure data from the A/D converter circuitry to generate output data from the co-processor of the DSP based upon a polynomial equation and stored polynomial coefficients;

communications circuitry configured to control communication with the process transmitter and transmit the output data from the co-processor of the DSP received from the DSP, wherein a first portion of the communications circuitry includes a digital communications modem;

a microprocessor, separate from the co-processor of the DSP, the separate microprocessor coupled between the co-processor and the communications circuitry and configured to process the output data from the co-processor of the DSP and to provide the output data from the co-processor of the DSP to the digital communications modem of the communications circuitry for the communication from the process transmitter to provide a first data path for the output data from the co-processor of the DSP to the communications circuitry, wherein the DSP, the separate microprocessor and the communications circuitry are configured to provide the first data path for the output data from the co-processor of the DSP, through the separate microprocessor, to the digital communications modem of the communication circuitry without further processing by the co-processor of the DSP after processing by the separate microprocessor;

wherein the DSP is also coupled to a second portion of the communications circuitry and is configured to provide a second shorter latency data path which bypasses the separate microprocessor for controlling the communications circuitry to communicate the output data from the co-processor of the DSP with reduced latency as compared to the communication of the output data from the co-processor of the DSP using the separate microprocessor and the first data path, wherein the DSP and the communications circuitry are configured to provide the second data path for the output data from the co-processor of the DSP to the second portion of the communications circuitry without processing by the separate microprocessor;

wherein the process transmitter is configured to be coupled to loop wiring and the communications circuitry is configured to control the communication over the loop wiring, and further comprising an output circuit configured to be coupled to the loop wiring to control a 4-20 mA current on the loop wiring; and wherein the communications circuitry comprises:

loop power circuitry configured to control the 4-20 mA current on the loop wiring; the digital communications modem coupled to the output circuit and configured to control the output circuit to communicate over the loop wiring using a digital communications protocol; and a digital-to-analog converter (DAC) coupled to the output circuit and configured to provide an analog signal to the output circuit to thereby control the 4-20 mA current on the loop wiring.

2. The process transmitter of claim 1, wherein the co-processor of the DSP is configured to receive interrupt requests from the A/D converter circuitry and control the communication with the A/D converter circuitry responsive to the interrupt requests.

3. The process transmitter of claim 2, wherein the communications circuitry comprises a wireless communication module.

4. The process transmitter of claim 1, wherein the digital communications protocol is a HART communications protocol.

5. The process transmitter of claim 1, wherein the DSP is coupled to the DAC to provide a digital value to the DAC for controlling the analog signal and thereby controlling the 4-20 mA current on the loop wiring, and wherein the separate microprocessor is coupled to the digital communications modem to control digital communications over the loop wiring using the digital communications protocol.

6. The process transmitter of claim 5, wherein the DSP further comprises the DAC of the communications circuitry.

7. The process transmitter of claim 6, and further comprising a serial peripheral interface (SPI) to controller area network (SPI to CAN) communications circuit coupled to the separate microprocessor and receiving SPI communications from the separate microprocessor.

8. The process transmitter of claim 7, and further comprising a communications module comprising the digital communications modem and the SPI to the CAN communications circuit.

9. The process transmitter of claim 8, and further comprising a diagnostics A/D converter coupled to the separate microprocessor and receiving the SPI communications from the separate microprocessor.

10. The process transmitter of claim 9, wherein the communications module further comprises the diagnostics A/D converter.

11. The process transmitter of claim 9, wherein the A/D converter circuitry coupled to the at least one pressure sensor comprises only analog components, the analog components of the A/D converter circuitry configured to provide outputs indicative of the process pressure data over pairs of high speed data (HSD) data lines coupled to the DSP, wherein the DSP further comprises decimation filter circuitry coupled to the pairs of high speed data lines and configured to convert the outputs of the A/D converter circuitry into multi-bit digital words representing the process pressure data.

12. The process transmitter of claim 11, and further comprising a mixed mode application specific integrated chip (ASIC), the mixed mode ASIC comprising the communications module and the analog components of the A/D converter circuitry.

13. The process transmitter of claim 12, and further comprising a digital DSP ASIC, the digital DSP ASIC comprising the DSP and the separate microprocessor.

14. The process transmitter of claim 11, and further comprising a combined analog and digital ASIC, the combined analog and digital ASIC comprising the DSP, the separate microprocessor, the communications module and the A/D converter circuitry.

15. The process transmitter of claim 11, wherein the A/D converter circuitry comprises sigma-delta converter circuitry, the process transmitter further comprising:
    data encoding circuitry coupled to the sigma-delta converter circuitry and encoding the outputs of the sigma-delta converter circuitry into a single data signal;
    data decoding circuitry in the DSP and coupled to the decimation filter circuitry, the data decoding circuitry decoding the single data signal into multiple data signals and providing the multiple data signals to the decimation filter circuitry for conversion into multi-bit digital words representing the process pressure data; and
    an isolation transformer coupled between the data encoding circuitry and the data decoding circuitry.

16. The process transmitter of claim 15, and further comprising:
    a clock circuit providing a clock signal to the sigma-delta converters and to the data encoding circuitry; and
    a clock signal isolation transformer coupled between the clock circuit and the DSP to provide the clock signal to the DSP while isolating the DSP from the clock circuit.

17. The process transmitter of claim 1, wherein the communications circuitry is configured to communicate the output data from the co-processor of the DSP to a location that is external to the process transmitter.

18. The process transmitter of claim 1, wherein the DSP further comprises input data registers configured to receive the process pressure data from the A/D converter circuitry, wherein the input data registers are coupled to and provide the process pressure data to the co-processor of the DSP, and wherein the input data registers are coupled to the separate microprocessor, separate from the co-processor of the DSP, through a serial peripheral interface (SPI) bus.

* * * * *